(12) United States Patent
Morsch et al.

(10) Patent No.: US 6,267,437 B1
(45) Date of Patent: Jul. 31, 2001

(54) FRONT PILLAR ARRANGEMENT FOR A MOTOR VEHICLE BODY FRAME

(75) Inventors: Klaus-Dieter Morsch; Klaus Friedewald, both of Braunschweig; Peter Pfeiffer, Lehre-Wendhausen; Arnold Ensslen; Andreas Weiss, both of Wolfsburg; Uwe Hoffmann, Flechtorf, all of (DE)

(73) Assignee: Volkswagen AG, Wolfsburg (DE)

( * ) Notice: Subject to any disclaimer, the term of this patent is extended or adjusted under 35 U.S.C. 154(b) by 0 days.

(21) Appl. No.: 09/442,823

(22) Filed: Nov. 18, 1999

(30) Foreign Application Priority Data

Nov. 19, 1998 (DE) .................................. 198 53 338

(51) Int. Cl.$^7$ .................................................. B60R 27/00
(52) U.S. Cl. ........................ 296/194; 296/30; 296/146.11
(58) Field of Search ............................. 296/202, 146.11, 296/30, 194, 29

(56) References Cited

U.S. PATENT DOCUMENTS 2,327,585 * 8/1943 Ulrich ................................ 296/30 X
5,560,674 * 10/1996 Tazaki et al. ....................... 296/30 X
5,624,150 * 4/1997 Venier ............................. 296/146.11

FOREIGN PATENT DOCUMENTS

| 32 22 807 | 12/1983 | (DE) . |
| 36 22 188 | 1/1987 | (DE) . |
| 40 16 730 | 11/1991 | (DE) . |
| 196 44 047 | 5/1998 | (DE) . |
| 197 06 301 | 8/1998 | (DE) . |
| 0040123 | 11/1981 | (EP) . |
| 0733539 | 9/1996 | (EP) . |
| 0255187 * | 10/1988 | (JP) ..................................... 296/202 |
| 8276864 | 10/1996 | (JP) . |
| 9226622 | 9/1997 | (JP) . |

* cited by examiner

Primary Examiner—D. Glenn Dayoan
Assistant Examiner—Lori L. Coletta
(74) Attorney, Agent, or Firm—Baker Botts L.L.P.

(57) ABSTRACT

A front pillar arrangement for a motor vehicle body frame includes a front pillar with an outer part and an inner part and a door hinge attached to the outer part of the front pillar with one or more fastening elements along with at least one reinforcing element for mounting the door hinge on the outer part of the front pillar. A rigid connecting element extends between the outer part and the inner part of the front pillar and is attached to the reinforcing element by at least one fastening elements for the door hinge.

10 Claims, 3 Drawing Sheets

FRONT PILLAR ARRANGEMENT FOR A MOTOR VEHICLE BODY FRAME

BACKGROUND OF THE INVENTION

This invention relates to front pillar arrangements for motor vehicle body frames having a door hinge attached to an outer part of the pillar.

German Offenlegungsschrift No. 32 22 807 describes the attachment of a component, such as a door hinge, to the door pillar of a motor vehicle in which a metal reinforcing sheet for mounting the hinge is provided between the hinge mount and the outer section of the door pillar and is welded to the outer section of the door pillar.

German Offenlegungsschrift No. 36 22 188 discloses an arrangement for connecting a front pillar and a cowl in a motor vehicle. In this arrangement, a reinforcing element provided inside the front pillar extends laterally through the hollow space formed by the front pillar and is welded by flanges between the outer part and the inner part of the front pillar. The overall construction of this arrangement is very costly, however.

The reinforcing element merely provides a certain torsional stiffness which hinders cross-sectional deformation of the front pillar which, in turn, helps to keep the door from moving downwardly.

German Patent No. 40 16 730 describes a support pillar for a motor vehicle body frame which has a pillar-like hollow body consisting of at least two profile shells and a tube that extends in the lengthwise direction of the hollow body and is fixed in a defined location. The effect of this is that, when roll-over loads about an axis or frontal impact loads occur, all of the deformation energy is absorbed by the front body pillar without appreciable deformation of the pillar. This design is also especially costly, particularly with respect to the incorporation of the tube. A similar construction is described in Japanese Published Application No. 8276864.

Moreover, Japanese Published Application No. 09-226622 describes a support with an essentially triangular reinforcing element. This support is intended to absorb the forces applied when a load is placed on the support pillar so that the support pillar does not bend toward the passenger compartment.

All of these prior art designs are comparatively costly. Furthermore, while they do absorb forces acting on a motor vehicle in a frontal or lateral collision, a frontal collision causes a horizontal offset between the vehicle door and the upper end of the side rail. This offset can be attributed to the fact that the front pillar folds more easily at its bottom end than at its top end. This horizontal offset causes a torque which stresses the door weatherstrip flange, resulting in a bending stress on the adjacent motor vehicle door.

SUMMARY OF THE INVENTION

Accordingly, it is an object of the present invention to provide a front pillar arrangement for a motor vehicle body frame which overcomes disadvantages of the prior art.

Another object of the present invention is to provide a front pillar arrangement which absorbs the torque caused by the horizontal offset between the motor vehicle door and the upper end of the front pillar and reduces the bending stress on the door.

These and other objects of the invention are attained by providing a front pillar arrangement for a motor vehicle body frame having a rigid connecting element between the outer part and the inner part of the front pillar in which the connecting element is attached to the outer part of the front pillar with the same fastening element that attaches the door hinge to the pillar. This component absorbs the forces arising as a result of the horizontal offset between the vehicle door and the upper end of the front pillar. In this way, the door weatherstrip flange is subjected to less stress, and thus relieved of the load, so that the bending stress on the vehicle door is reduced.

In one advantageous embodiment of the invention, the connecting element is a sleeve which extends approximately perpendicularly to the outer part of the front pillar and is attached by a threaded joint or riveted joint to the inner part of the front pillar. However, the rigid connecting element can also be a flat sheet of metal or the like having two connecting flanges by which it is attached to the outer part and the inner part of the front pillar.

With this arrangement, two especially simple and economical connecting element structures are possible both of which can be fixed in place at one end using the fastening element for the door hinge. This provides a reinforcement for the front pillar having an especially simple design.

The other end of the connecting element is attached to the inner wall of the front pillar. The inner wall of the wheel well for the adjacent front wheel of the vehicle can also constitute the inner wall of the front pillar.

The connecting element, especially in the form of a sleeve, is preferably attached to the outer or inner wall of the front pillar by screws or rivets. If a flat sheet of metal is used as the connecting element, it can also be attached to the inner wall of the front pillar by welding.

BRIEF DESCRIPTION OF THE DRAWINGS

Further objects and advantages of the invention will be apparent from a reading of the following description in conjunction with the accompanying drawings, in which.

DESCRIPTION OF PREFERRED EMBODIMENTS

Figure 1:
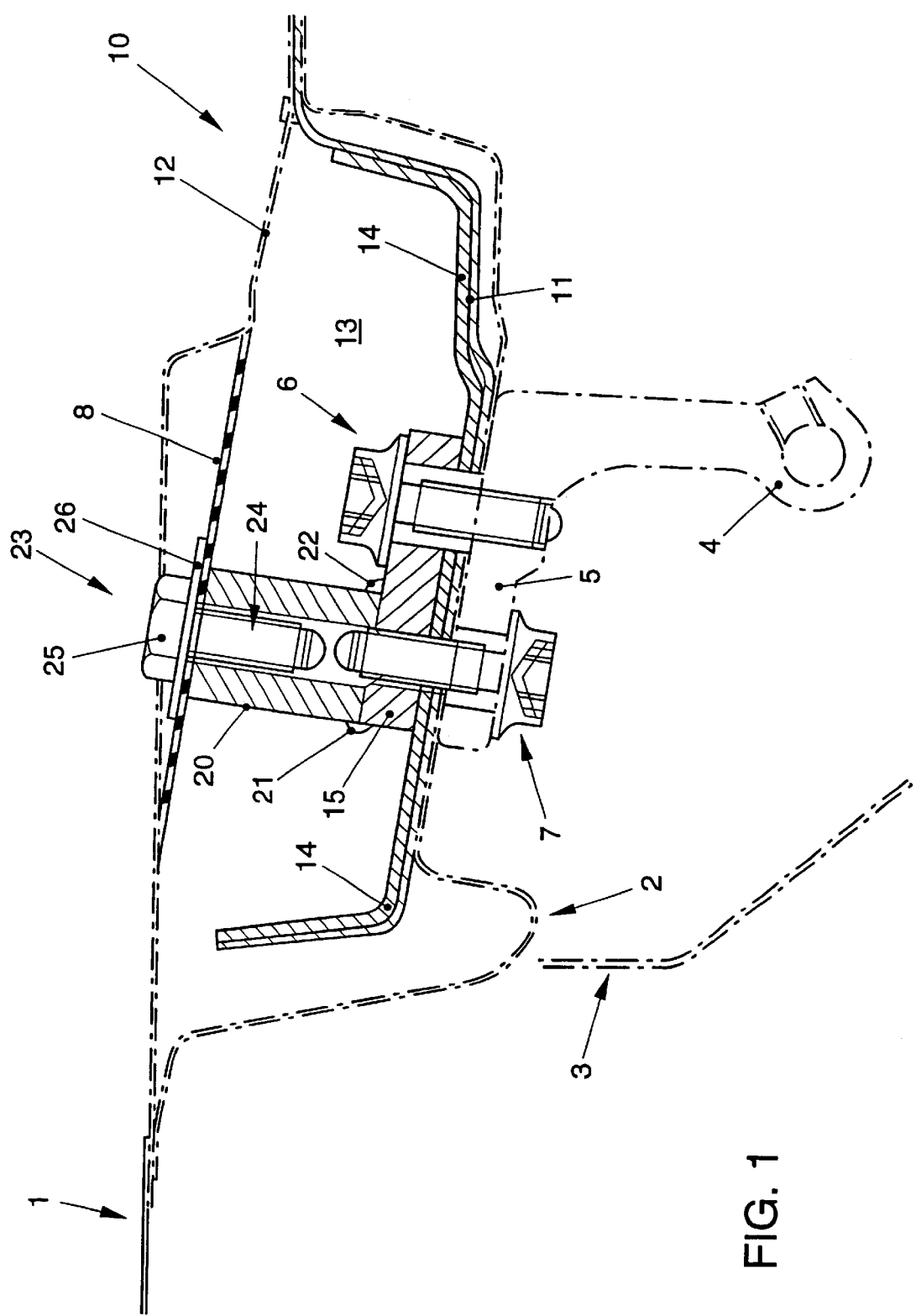
FIG. 1 is a schematic, partially cutaway plan view of a front pillar illustrating a first representative embodiment of the invention having one form of connecting element.

The typical embodiment of the invention schematically illustrated in FIG. 1 shows. a partially cutaway view of a left front pillar 10 of a motor vehicle. To aid in orientation, the cowl 1 of the motor vehicle body, the outer contour 2 of the side piece of the body and the support 3 for the adjacent motor vehicle fender are also sketched in. The left front pillar 10 consists of an outer part 11 and an inner part 12 which together enclose an internal space 13. The door hinge 4, which is shown in dot-dash outline, is attached to the outer part 11 of the front pillar by two threaded connections 6 and 7 connecting it to a base element 5. Provided along the inside surface of the outer part of the pillar 11 is a reinforcing plate 14 which reinforces the fastening of door hinge 4. In this context, the reinforcing plate 14 is also used for mounting the door hinge 4. Also provided on the reinforcing plate 14 is a threaded hinge plate 15 which faces toward the interior space 13 of the front pillar 10 and receives the screws 6 and 7.

In addition, a connecting element 20 in the form of a sleeve extends approximately at right angles to the hinge plate 15 completely across the interior space 13 of the front pillar 10. The sleeve 20 is affixed to the threaded hinge plate 15 by weld points 21 and 22 and is attached by a threaded connection 23 to the inner part 12 of the front pillar 10. A plain washer 26 is provided between the head 25 of the screw 24 and the inner side 12 of the front pillar 10.

It can also be seen that, in the exemplary embodiment shown in FIG. 1, the sleeve 20 for producing the rigid connection is additionally attached to the inner wall 8 of a wheel well for the adjacent front wheel. This inner wall 8 of the wheel well also constitutes the inner side 12 of the front pillar 10.

Figure 3:
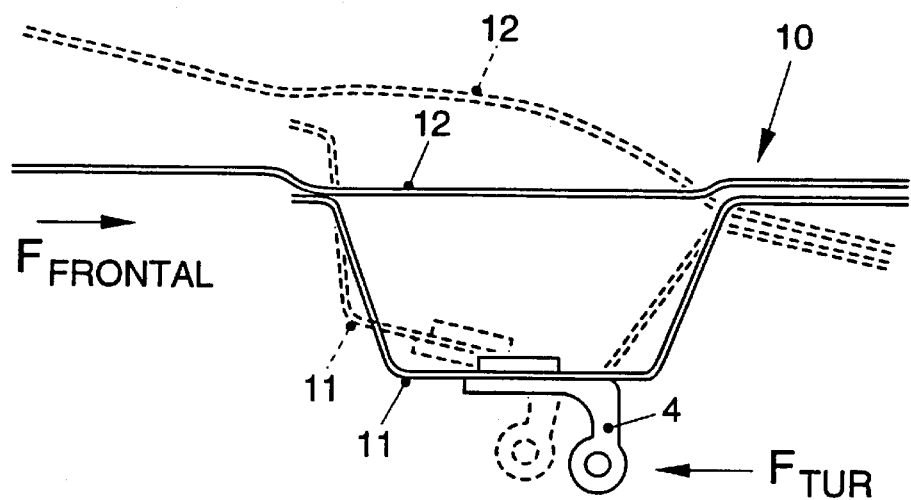
FIG. 3 is a schematic view illustrating the horizontal offset between a door and a front pillar in a frontal collision.

FIG. 3 shows the effect of the connecting element 20 on a frontal pillar of this type. Since the bottom section of the front pillar folds more easily than the top section, this produces a horizontal offset between the door and the upper section of the front pillar. This causes a torque which acts on the door weatherstrip flange and induces an overall bending stress for the door. By providing a rigid inner connection 20 between the outer part 11 and the inner part 12 of the pillar, the torque created by the horizontal offset is absorbed so that the door weatherstrip flange is relieved of the load and the overall bending load is slight.

Figure 2:
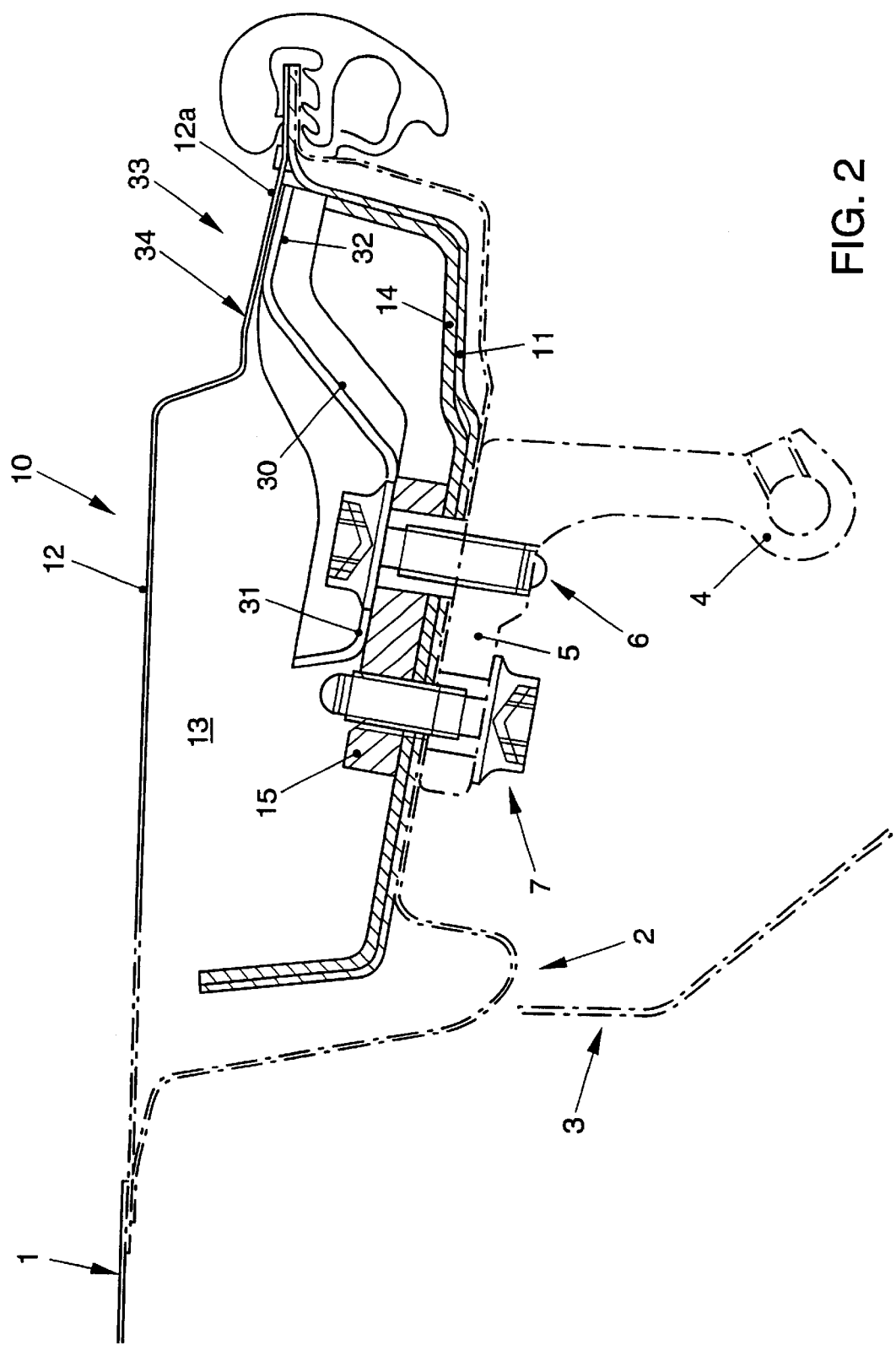
FIG. 2 is a schematic, partially cutaway plan view of a front pillar illustrating a second representative embodiment of the invention having another form of connecting element.

FIG. 2 shows another embodiment of a front pillar 10 and, as a further aid in orientation, a cowl 1, the outside surface of the side piece 2 and the support 3 of an adjacent fender are also sketched in. In this embodiment as well, the door hinge 4 is attached in the manner described above. In this arrangement, a rigid connecting element 30 is constituted by a flat metal sheet or the like which is bent at two places at angles of about 60° so that it has two flanges 31 and 32. The flange 31 is affixed to the threaded plate 15 by the threaded connection 6 provided for the door hinge 4. The flange 32 is affixed to the projecting end 12a of the inner part 12 of the front pillar 10 by rivets or screws or by welding. For this purpose, one or more weld points can be made in the region 33. A fillet weld can be made at the joint 34 instead of, or in addition to, welds in the region 33.

The connecting element 30 functions in essentially the same way as the connecting element 20, that is, it absorbs forces created by a horizontal offset between the door and the upper end of the front pillar so that at least a reduced bending stress on the vehicle door is achieved.

In the foregoing description, a pillar arrangement at the left front side of a motor vehicle is shown by way of example. Since the left and right front pillars are symmetrical with respect to the longitudinal axis of the motor vehicle, the above description applies analogously to a right front pillar arrangement.

Although the invention has been described herein with reference to specific embodiments, many modifications and variations therein will readily occur to those skilled in the art. Accordingly, all such variations and modifications are included within the intended scope of the invention.

We claim:

1. A front pillar arrangement for a motor vehicle body frame comprising;
    a front pillar having an outer part and an inner part with respect to a transverse direction of the vehicle;
    a door hinge attached to the outer part of the front pillar by at least one fastening element and at least one reinforcing element; and
    a rigid connecting element between the, reinforcing element and the inner part of the front pillar which is attached to the reinforcing element wherein the reinforcing element comprises a hinge plate on the inner side of the outer part of the front pillar and the at least one fastening element comprises a screw extending through the door hinge and the outer part of the front pillar and threaded into the hinge plate.

2. A front pillar arrangement in accordance with claim 1 wherein the rigid connecting element is a sleeve which extends approximately at right angles to the outer part of the front pillar and is attached by a connection to the inner part of the front pillar.

3. A front pillar arrangement in accordance with claim 2 wherein an inner wall of a wheel well for an adjacent vehicle wheel serves as the inner part of the front pillar.

4. A front pillar arrangement in accordance with claim 1 wherein the rigid connecting element is a flat metal sheet having two connecting flanges by which it is attached to the outer part and the inner part of the front pillar.

5. A front pillar arrangement in accordance with claim 4 wherein the flat metal sheet is bent at angles of approximately 60° to form the two connecting flanges.

6. A front pillar arrangement in accordance with claim 4 wherein the flat metal sheet is attached to the inner part of the front pillar by at least one of screws, rivets, and welds.

7. A front pillar arrangement in accordance with claim 6 wherein the flat metal sheet is attached to the inner part of the front pillar by at least one of weld points and fillet welds.

8. A front pillar arrangement according to claim 1 including a second screw extending through the inner part of the front pillar and threaded into the rigid connecting element.

9. A front pillar arrangement in accordance with claim 8 wherein the rigid connecting element is affixed to the hinge plate by welding.

10. A front pillar arrangement according to claim 1 wherein the rigid connecting element is affixed to the hinge plate by welding.

* * * * *